Dec. 21, 1948.                M. G. DE SIMONE                 2,456,771
                     ELECTROMECHANICAL MECHANISM FOR
                       ACTUATING CALCULATING MACHINES
Original Filed April 14, 1942                          13 Sheets-Sheet 1

INVENTOR
Michele Guglielmo De Simone
BY
A. D. T. Libby
ATTORNEY

Dec. 21, 1948.   M. G. DE SIMONE   2,456,771
ELECTROMECHANICAL MECHANISM FOR
ACTUATING CALCULATING MACHINES
Original Filed April 14, 1942   13 Sheets-Sheet 3
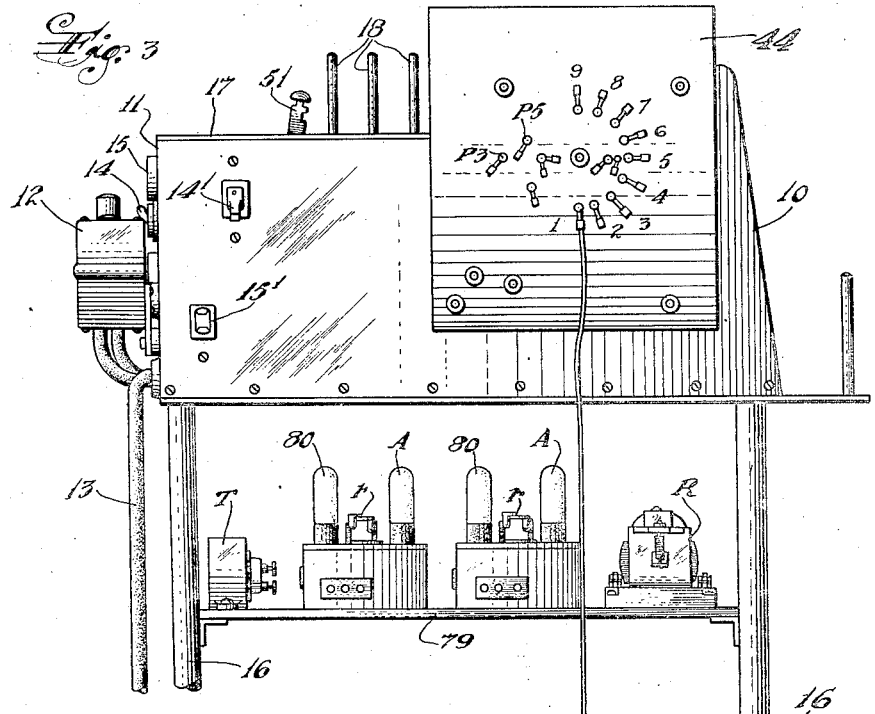
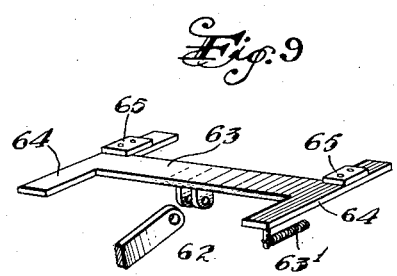
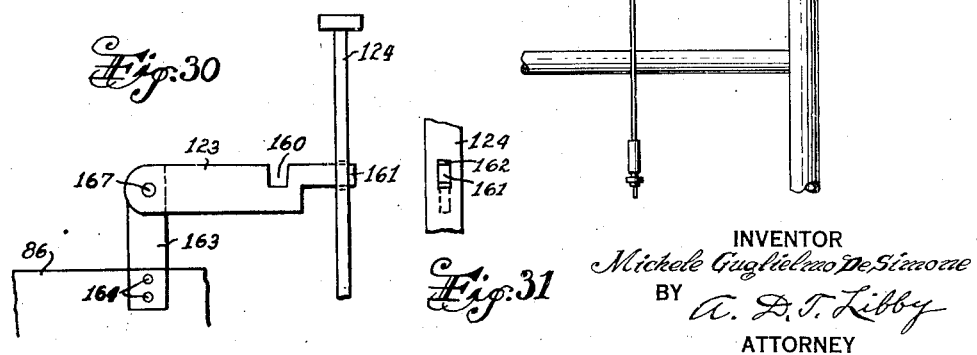
INVENTOR
Michele Guglielmo De Simone
BY
A. D. T. Libby
ATTORNEY Dec. 21, 1948.   M. G. DE SIMONE   2,456,771
ELECTROMECHANICAL MECHANISM FOR
ACTUATING CALCULATING MACHINES
Original Filed April 14, 1942   13 Sheets-Sheet 4

INVENTOR
Michele Guglielmo De Simone
BY A. D. T. Libby
ATTORNEY

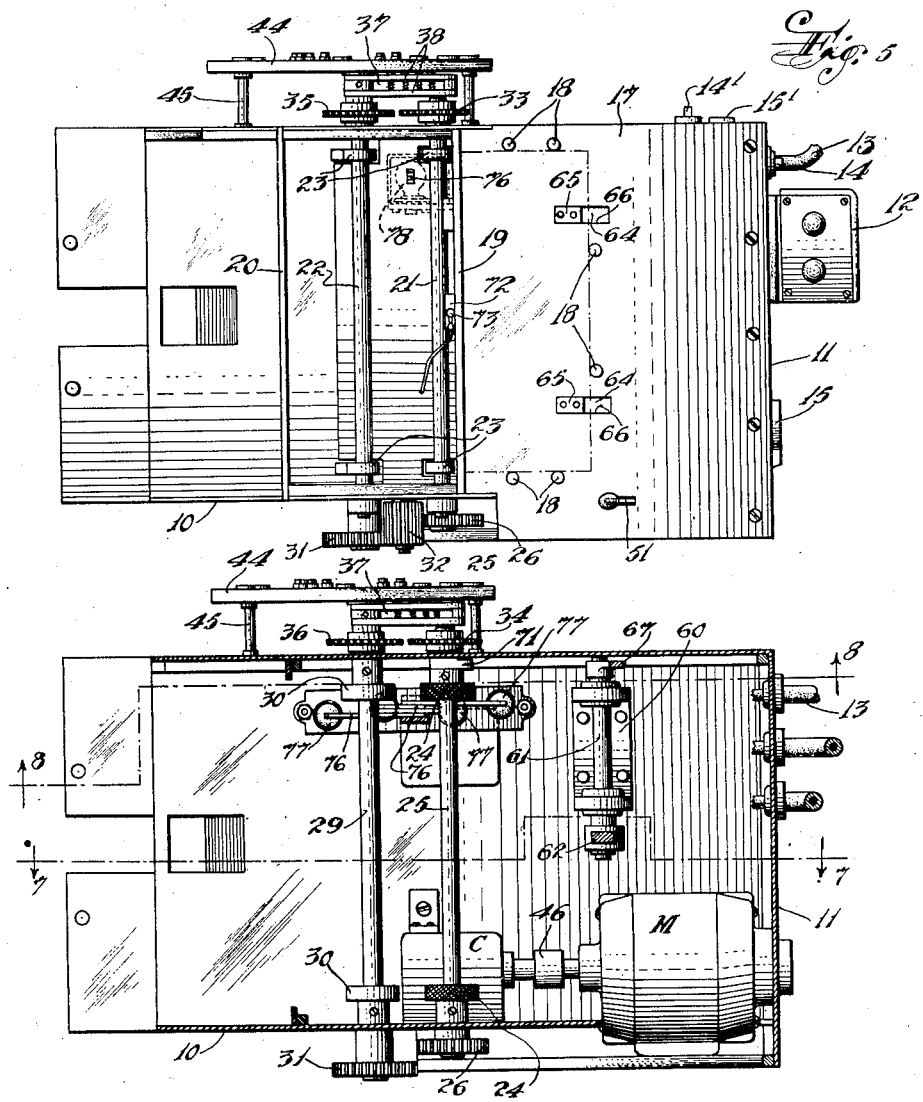

Dec. 21, 1948.                M. G. DE SIMONE                    2,456,771
                        ELECTROMECHANICAL MECHANISM FOR
                         ACTUATING CALCULATING MACHINES
Original Filed April 14, 1942                        13 Sheets-Sheet 6
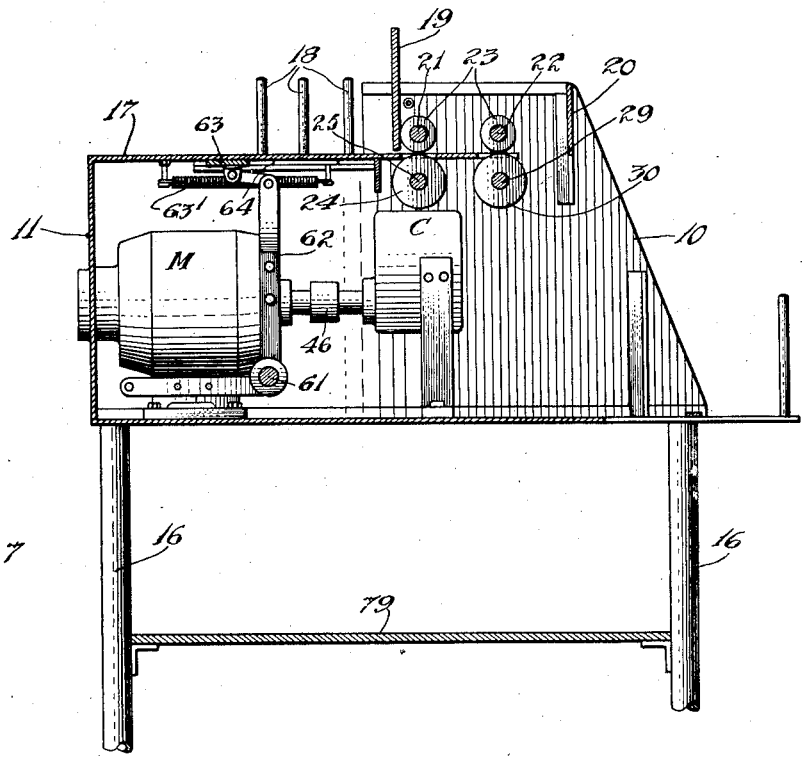
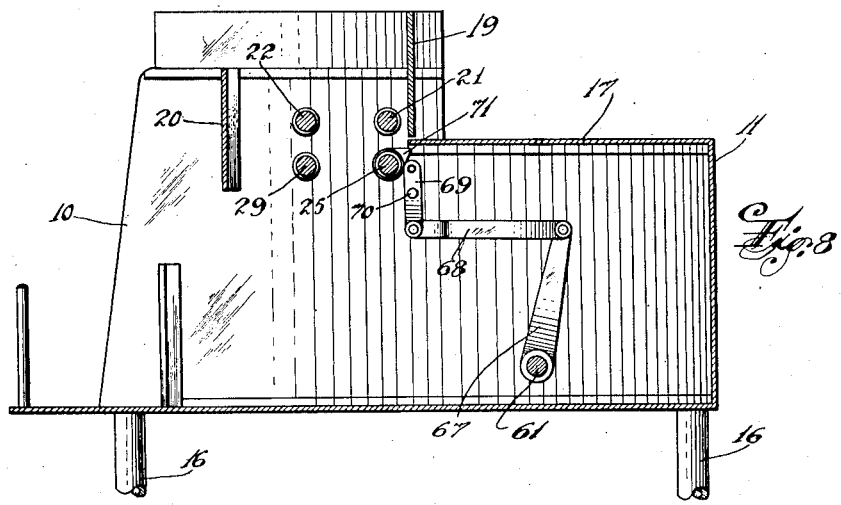
INVENTOR
Michele Guglielmo De Simone
BY
A. D. T. Libby
ATTORNEY Dec. 21, 1948. M. G. DE SIMONE 2,456,771
ELECTROMECHANICAL MECHANISM FOR
ACTUATING CALCULATING MACHINES
Original Filed April 14, 1942 13 Sheets-Sheet 7
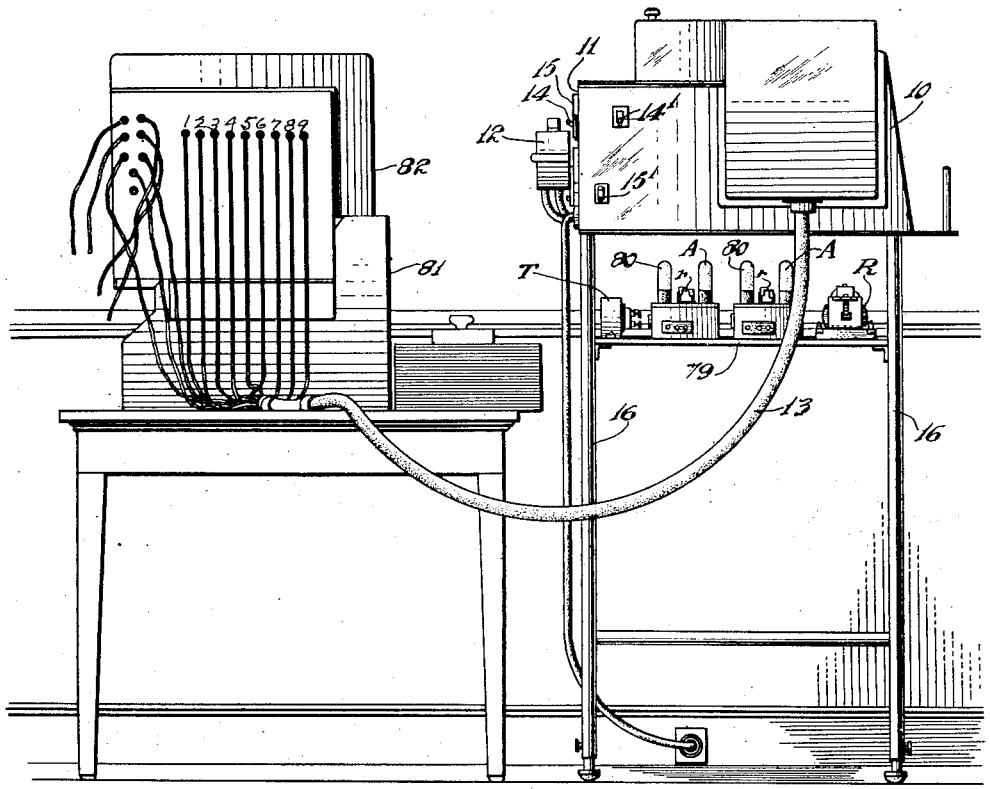
INVENTOR
Michele Guglielmo De Simone
BY
A. D. T. Libby
ATTORNEY Dec. 21, 1948.  M. G. DE SIMONE  2,456,771
ELECTROMECHANICAL MECHANISM FOR
ACTUATING CALCULATING MACHINES
Original Filed April 14, 1942  13 Sheets-Sheet 8
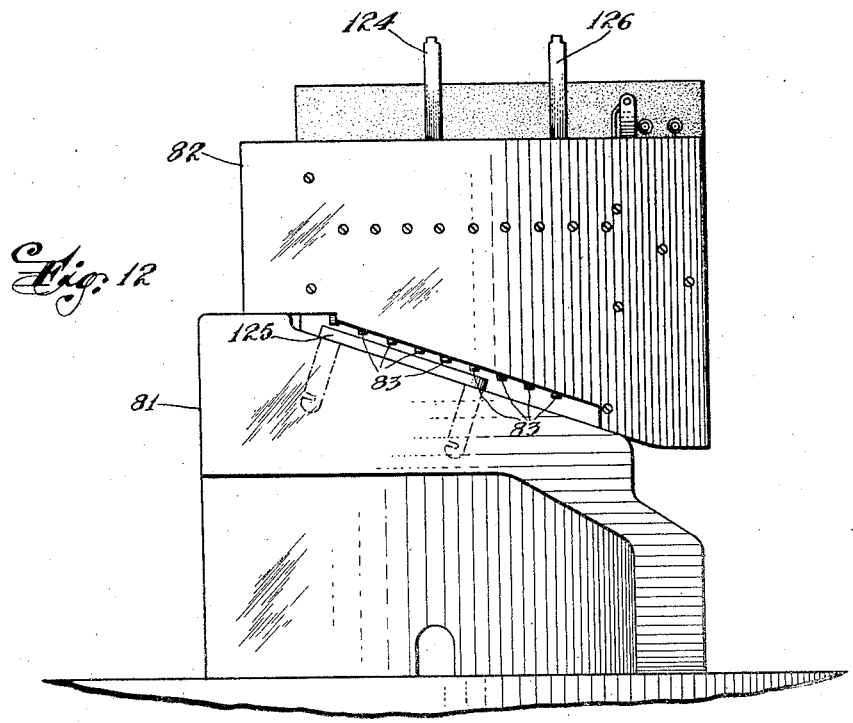
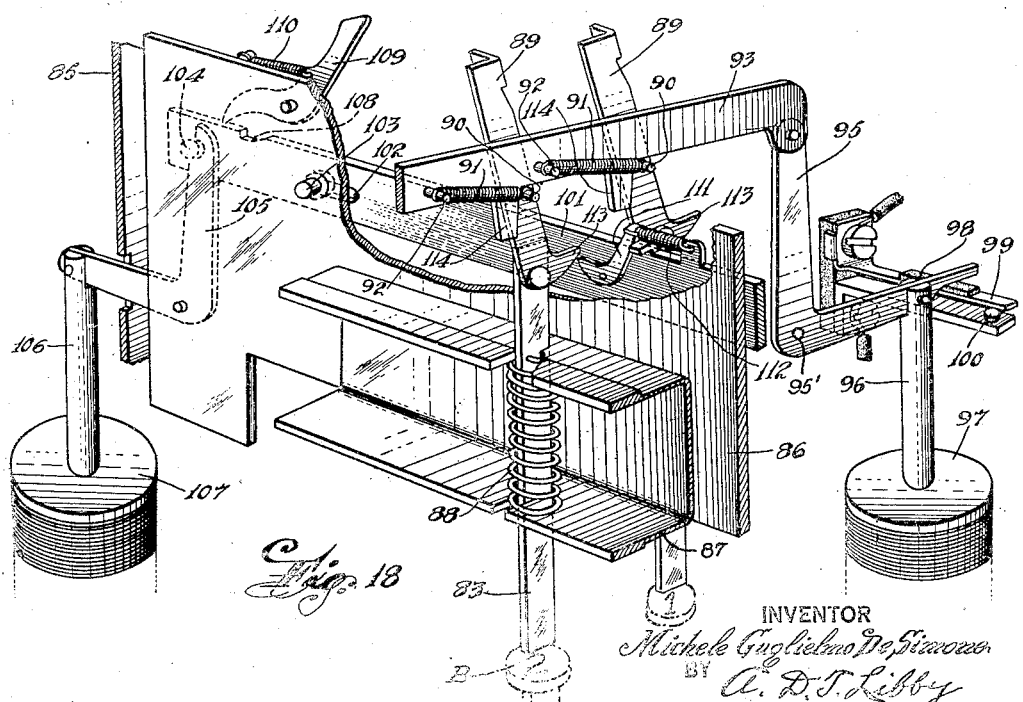
INVENTOR
Michele Guglielmo De Simone
BY
A. D. T. Libby
ATTORNEY Dec. 21, 1948.  M. G. DE SIMONE  2,456,771
ELECTROMECHANICAL MECHANISM FOR
ACTUATING CALCULATING MACHINES
Original Filed April 14, 1942   13 Sheets-Sheet 9
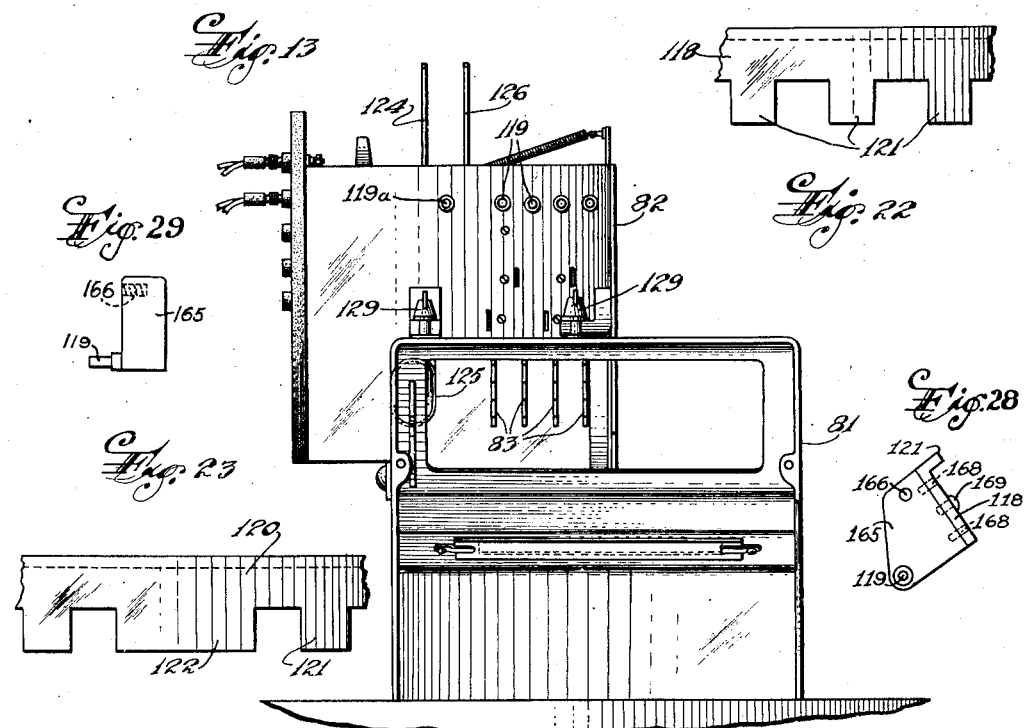
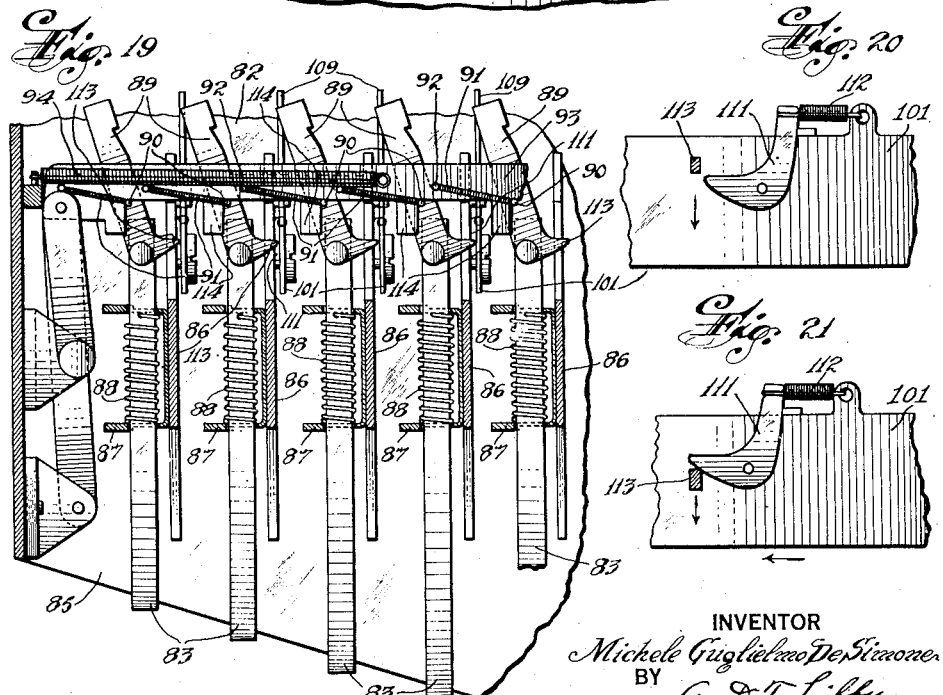
INVENTOR
Michele Guglielmo De Simone,
BY
A. D. T. Libby
ATTORNEY

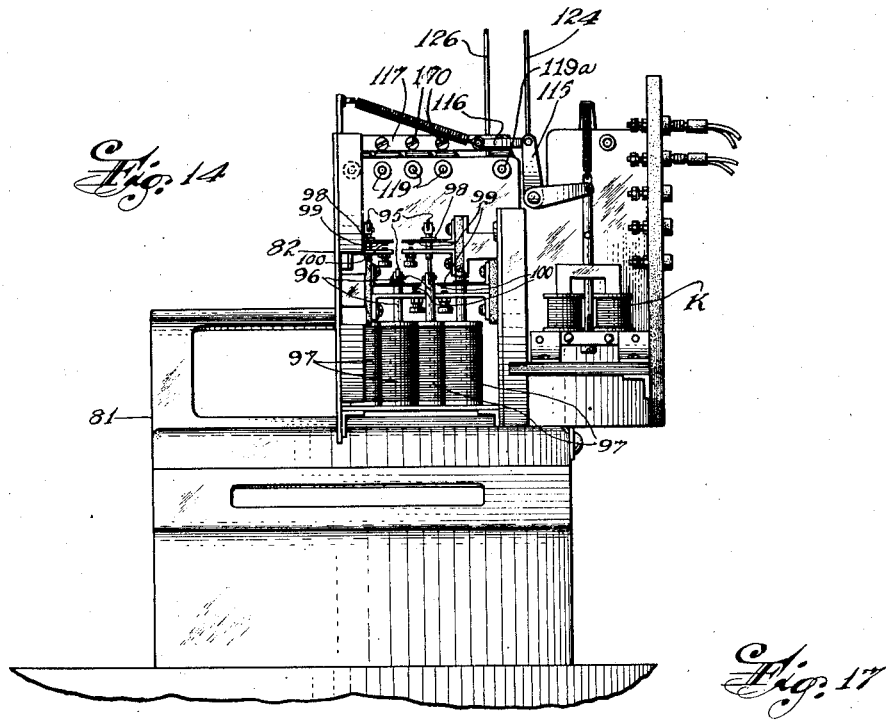

Dec. 21, 1948.
M. G. DE SIMONE
2,456,771
ELECTROMECHANICAL MECHANISM FOR
ACTUATING CALCULATING MACHINES
Original Filed April 14, 1942
13 Sheets-Sheet 11
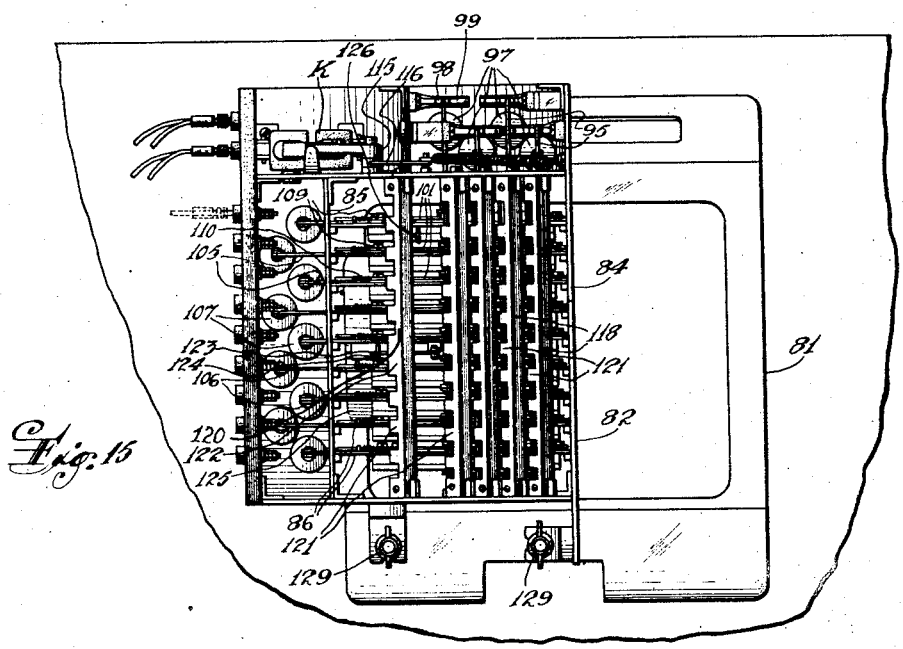
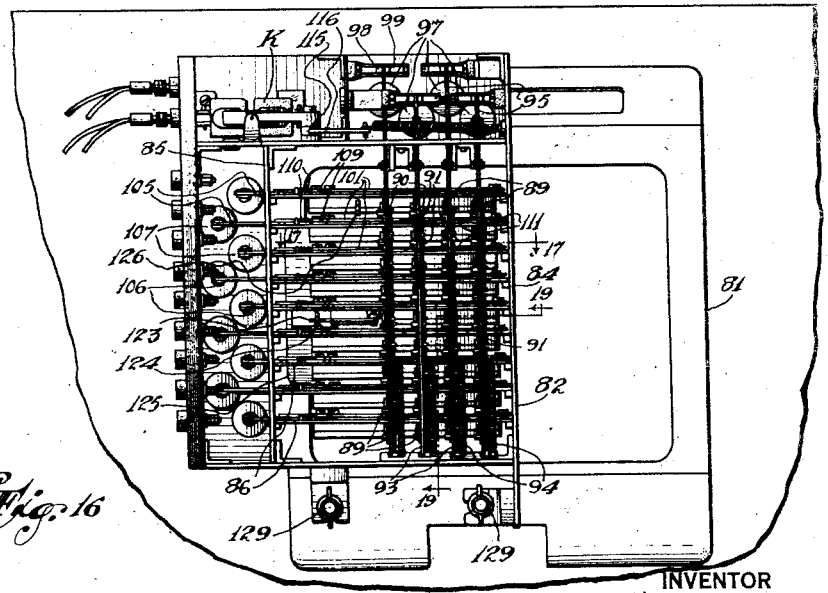
INVENTOR
Michele Guglielmo De Simone
BY
A. D. T. Libby
ATTORNEY Dec. 21, 1948.    M. G. DE SIMONE    2,456,771
ELECTROMECHANICAL MECHANISM FOR
ACTUATING CALCULATING MACHINES
Original Filed April 14, 1942    13 Sheets-Sheet 12
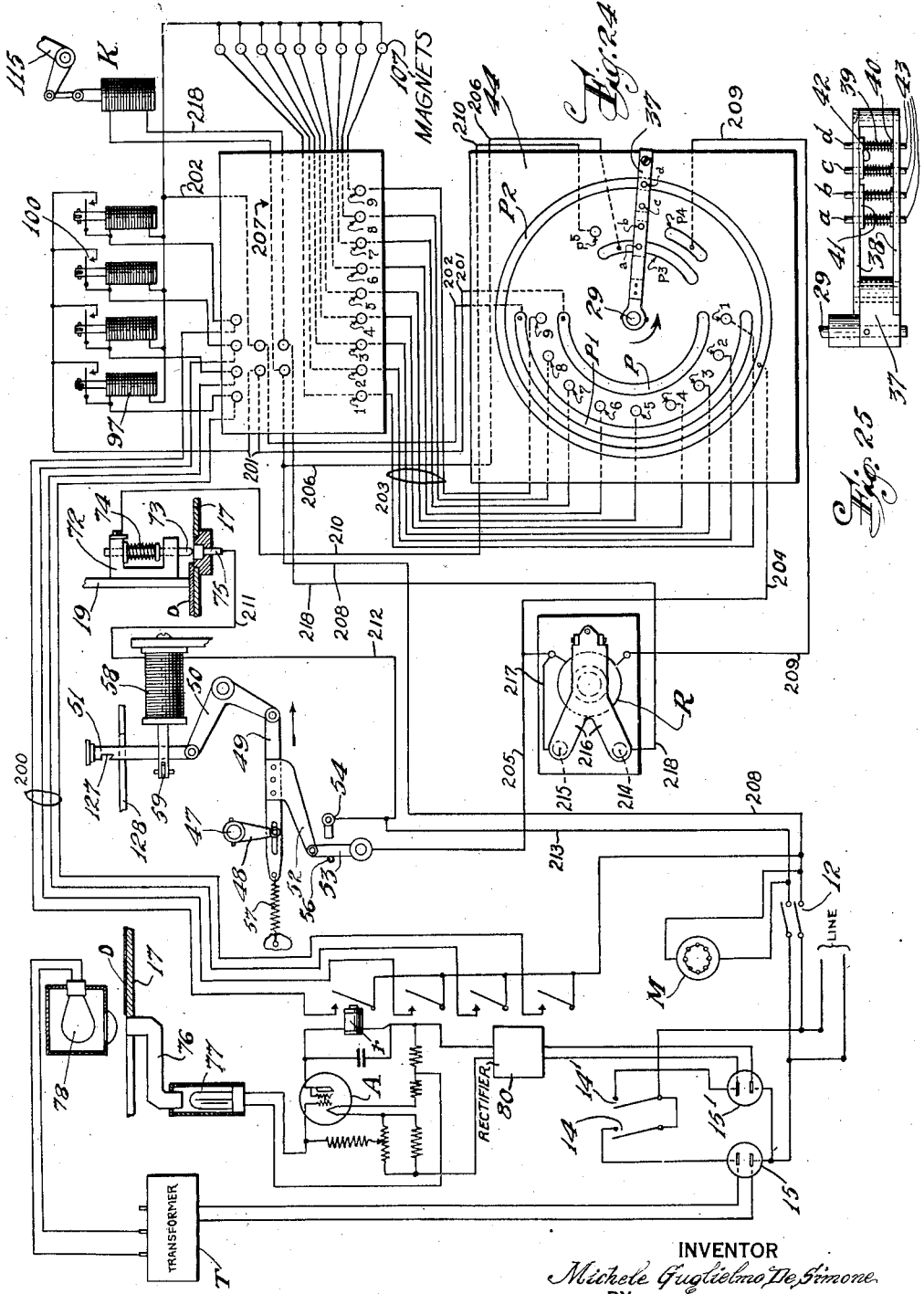
INVENTOR
Michele Guglielmo De Simone
BY
A. D. T. Libby
ATTORNEY

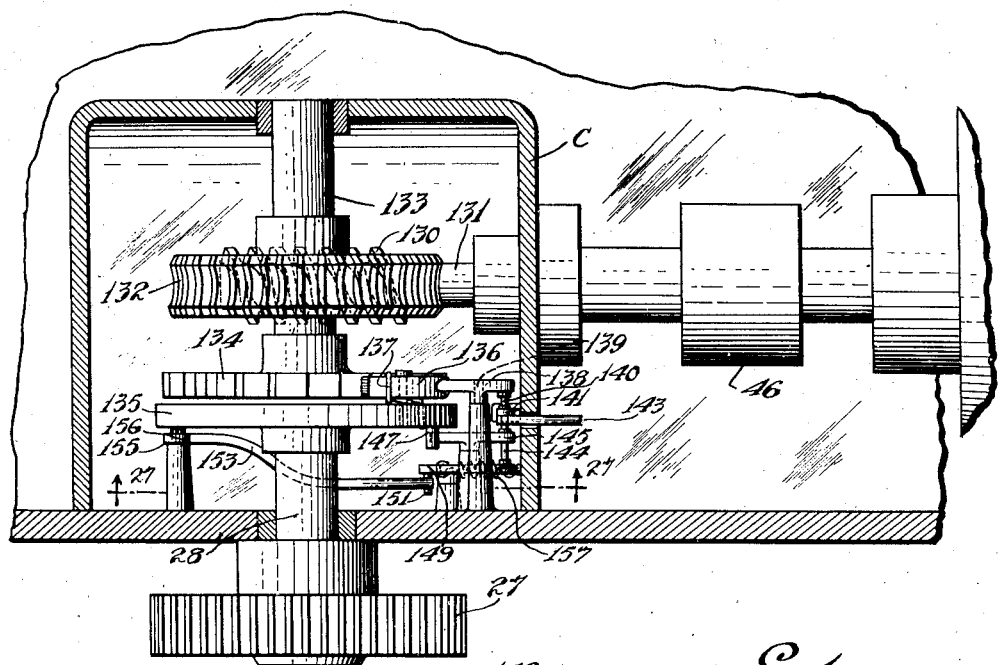

Patented Dec. 21, 1948

2,456,771

UNITED STATES PATENT OFFICE 2,456,771

ELECTROMECHANICAL MECHANISM FOR ACTUATING CALCULATING MACHINES

Michele Guglielmo de Simone, Stapleton, N. Y., assignor to A. Gifford Agnew, New York, N. Y.

Continuation of application Serial No. 438,890, April 14, 1942. This application June 14, 1947, Serial No. 754,751

8 Claims. (Cl. 235—61.6)

In my Patent 2,195,080, issued March 26, 1940, I have shown and described a form of electromechanical mechanism for actuating calculating machines and recording the results therefrom.

My present invention relates to a new form of apparatus for accomplishing the results in a more positive and efficient manner. This application is a continuation of application Serial No. 438,890 which was filed April 14, 1942, now abandoned.

It is the general object of my present invention to provide a new design of setting-up mechanism that accomplishes the principal object set forth in my prior patent which may be restated as follows:

It is one of the objects of my invention to provide an electro-mechanical mechanism or a combination of mechanisms whereby electrical impulses, governed by a predetermined pattern or design which is passed through a sensing mechanism, are caused to operate a setting up mechanism to position stops therein corresponding to the electrical impulses sent to the setting up mechanism and as controlled by said pattern or design or equivalent mechanism for sending these electrical impulses in a predetermined manner. The said stops of the setting up mechanism are mechanically utilized to assist in the operation of selecting keys of a calculating machine or mechanism, whereby when the calculating machine or mechanism is set in operation by the setting up mechanism, the results of the calculating machine or mechanism will be recorded in such a manner that the record may be subsequently and directly used for other purposes, including the passing of said records through a tabulating machine whereby the record or results of the calculating machine or mechanism may be quickly summarized.

In my patent, the electrical circuit from the sensing mechanism include a plurality of very small and rather delicate sensing springs which are required to pass through openings in the card or pattern being passed through the apparatus. I encountered many difficulties, which will be clearly apparent to one skilled in this art without enumeration thereof, with this construction in obtaining positive electrical contacts in the continued operation of the machine.

It is therefore one of the objects of my present invention to eliminate all of these springs and attendant difficulties by a new construction wherein the impulses are passed along to other instrumentalities of the mechanism by means of light derived from a suitable quick acting source which is positive in its action and free from all inertia.

In my prior patent the speed of rotation of the feed roll, as well as the operating shaft for the cams controlling the movement of the trapping bars, was relatively slow. Also, the cams for operating the trapping bars were subject to considerable wear and, besides, they gave a fixed stroke requiring much greater accuracy in manufacture and adjustment. It is therefore another object of my invention to provide an arrangement wherein the entire mechanism may be operated at a higher speed and the trapping positively secured without an absolutely fixed movement of the trapping bars. I accomplish this object by using a distributor for operating the electromagnets connected with the trapping bars, all in the manner which will be later pointed out.

Another object of my invention is to provide a much more resilient and improved form of means for operating the keys and touch-bar of the calculating machine, and the release of the trapping bars of my improved form of setting-up mechanism.

These and other objects will be clear to one skilled in this art after a reading of the following specification, taken in connection with the annexed drawings, wherein:

Figure 3 is a view of Figure 1, looking at the right-hand side thereof.

Figure 5 is a plan view, on a reduced scale, of the structure shown in Figure 1, showing the card-advancing mechanism in the advanced position.

Figure 6 is a view similar to Figure 5, but taken just below the top card support plate and about on the line 6—6 of Figure 2, between the two sets of rollers.

Figure 7 is a view about on the line 7—7 of Figure 6.

Figure 8 is a view about on the line 8—8 of Figure 6, certain parts being omitted to better illustrate those that are desired to be shown.

Figure 9 is a perspective view of two of the card-advancing parts, one of the parts being partially shown in Figure 5.

Figure 10 is an assembled view of the two parts of the apparatus interconnected by electrical cable, the part to the right being that portion shown in Figures 1 to 8 inclusive, while the portion to the left is the signal setting-up mechanism.

Figure 11 is a fragmentary view illustrating the method of interconnecting the electrical parts of the two pieces of apparatus.

Figure 12 is an elevational view on one side of the setting-up apparatus shown on the left-hand side of Figure 10.

Figure 13 is an end view of the apparatus shown in Figure 12, looking from left to right.

Figure 14 is a view of Figure 12 looking from right to left, or the side opposite that shown in Figure 13.

Figure 15 is a plan view of the structure shown in Figure 12.

Figure 16 is a view similar to Figure 15, but with certain of the top cross-bar operating members removed.

Figure 17 is a partial, sectional view on the line 17—17 of Figure 16.

Figure 18 is a perspective view showing, on a large scale, certain of the parts shown in Figure 17, together with two of the operating electromagnets.

Figure 19 is a fragmentary, sectional view on the line 19—19 of Figure 16.

Figures 20 and 21 are fragmentary views showing different stages of operation of the trapping pawl.

Figure 22 is a fragmentary view showing the side elevation of one of the regular depressing bars shown in Figure 15.

Figure 23 is a view similar to Figure 22, but showing a special depressing and resetting bar shown in Figure 15.

Figure 24 is a circuit diagram showing the manner of interconnecting the various parts of the two pieces of apparatus illustrated in Figure 10.

Figure 25 is a side view of the distributor arm shown in the lower right-hand part of Figure 24.

Figure 26 is a part-sectional and part-plan view of the clutch mechanism used to connect the driving motor with the other apparatus.

Figure 27 is a part-sectional and elevational view of Figure 26 about on the line 27—27.

Figure 28 is a full-size end view of either of the bars 118 and 120.

Figure 29 is a view of the block, only, carrying the bar 118 of Figure 28.

Figure 30 is an approximately full-size view of certain parts used in connection with the rod actuating the touch bar of the machine to which my invention is applied.

Figure 31 is a partial view of Figure 30, looking from right to left.

*Sensing apparatus*

Figure 1:
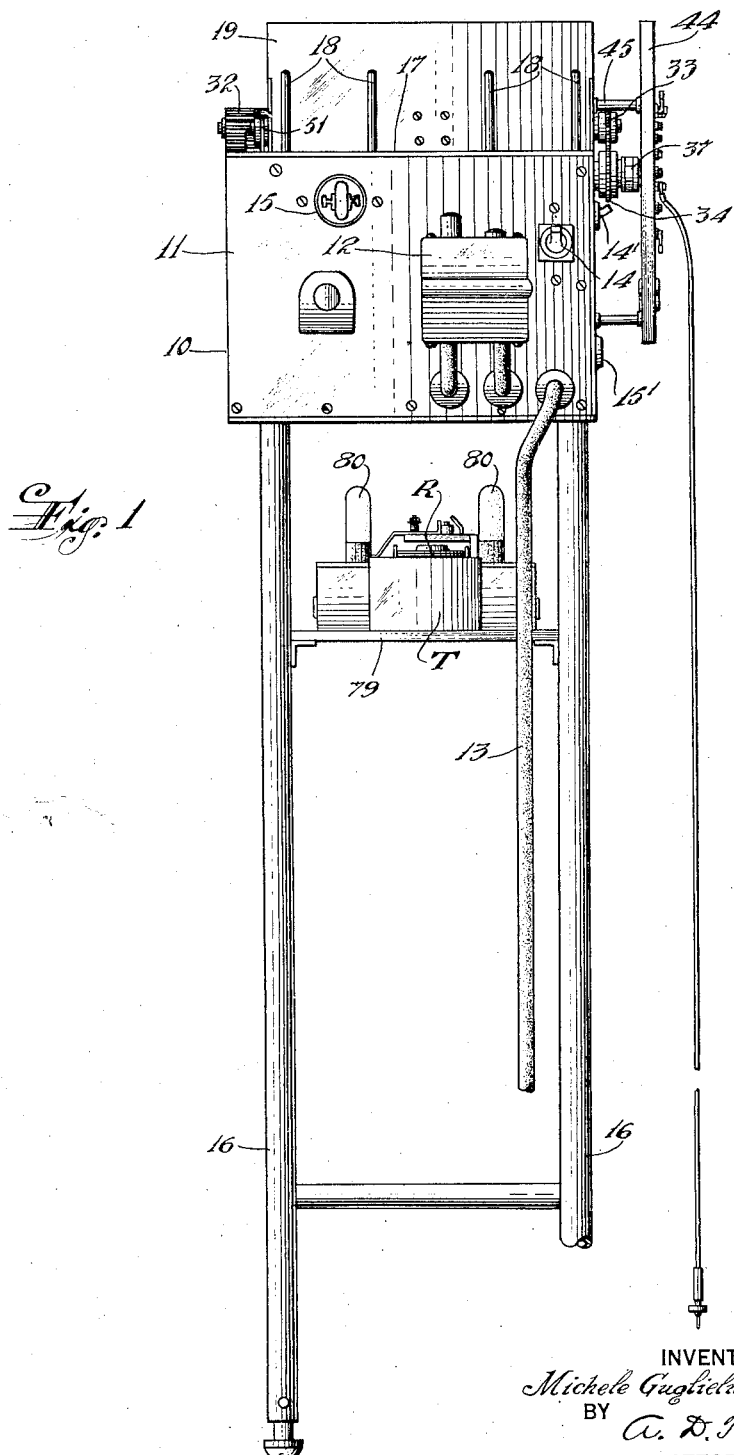
Figure 1 is an elevational view of one end of the mechanism for passing or handling the cards which control the current impulses which are to be passed to other parts of the associated mechanism, only one of the passing conductors being indicated.

In the various views, which in most cases are on a reduced scale, wherein like numbers refer to corresponding parts, 10 is a casing having a front plate member 11 on which is mounted a current control switch 12 to which is connected a cable 13 suitable for plugging into any current-supply socket. The plate 11 also carries an auxiliary switch 14 and an outlet socket 15. The casing also carries on the side thereof, a switch 14′ and an outlet socket 15′ (see Figure 1). The casing 10 is carried on four support legs 16.

A top plate member 17 is provided with a plurality of studs 18 and a partition 19, both of which serve to position the stacked cards which are to be sent through the sending mechanism. The plate 17 extends forward of the partition 19 to the line 20.

Forward of the partition 19, and above the plate 17 and supported in the side walls of the casing, are two shafts 21 and 22, each carrying adjacent its opposite ends rollers 23. The rollers 23 on the shaft 21 are in driving engagement with knurled rollers 24 carried on a shaft 25 located directly below the plate 17 and which has at one end a gear wheel 26 in mesh with a gear wheel 27 that in turn is carried on a driven shaft 28 to which reference will be later made. Another shaft 29 is supported directly below the plate 17 by the opposite sides of the casing and carries at its opposite ends card-driving rollers 30 which may have smooth peripheral surfaces to cooperate with the surfaces of the rollers 23 on the shaft 22. The shaft 29 carries a gear 31 which is operatively driven from the gear 26 by means of an idler gear 32.

The shaft 21 is driven by a gear 33 in mesh with a gear 34 carried on the end of the shaft 25. Likewise, the shaft 22 carries a gear 35 in mesh with a gear 36 drivingly carried by the shaft 29, on the outer end of which is carried a distributor arm 37. The distributor arm 37 (see Figure 25) has two sides members 38 of strong insulating material, between which are positioned four contact studs $a$, $b$, $c$ and $d$. These studs are spring-pressed by spring 39 acting at one end against collars 40 on the studs, and at the other end, in the case of studs $a$ and $b$, against a metallic plate member 41; and, in the case of studs $c$ and $d$, against a metallic plate member 42. Thus, by reason of the plate 41, the studs $a$ and $b$ are electrically connected together; likewise, the studs $c$ and $d$ are electrically connected together by the plate 42. The ends 43 of the studs $a$, $b$, $c$ and $d$ are adapted to contact with metallic inserts or contacts carried by a distributor block 44 that is supported by the casing 10 by a plurality of studs 45. From what has been said it is to be understood that the distributor arm 37 is driven in synchronism with the card-feeding apparatus to be presently described, and in such a manner as to cause the contacts 9 to 1 on the distributor to be successively engaged by the distributor arm as the corresponding numeral perforations are brought into sensing position.

The distributor block 44 carries contacts 1 to 9 inclusive, as well as arcuate segmental contacts P, $P_1$, $P_2$, $P_3$, $P_4$, and a contact $P_5$ (see Figure 24), reference to which will be later made in the description of the operation of the structure. Within the casing 10 is carried a motor M attached by a coupling 46 to a clutch structure C. This entire clutch structure, as illustrated by the casing C in Figures 4 and 6, comprises, as shown in Figures 26 and 27, a worm 130 fastened on the shaft 131 extending from the coupling 46. The worm is in mesh with a gear-wheel 132 fastened to a stub shaft 133 supported by the casing C. On the inner end of the stub shaft 133 is fastened a ratchet type gear forming a driving member 134. Mounted closely adjacent the driving member 134 is a driven member 135 fastened on the shaft 28 which also fixedly carries, exteriorly of the casing C, the gear-wheel 27 to which reference has already been made.

Carried on the member 135 is a pawl 136 which under the action of a spring 137, tends to engage the ratchet teeth in the driving member 134. Engaging one end of the pawl 136 is a lever 138 pivoted at 139 and also pivotally connected at 140 with a connecting rod or bar 141 that in turn is pivoted at 142 to the arm 143 of a bellcrank lever pivoted at 47. The other arm, 48, of the lever is connected with a link 49 that in turn is connected through a bellcrank lever 50 with a starting lever 51 (see Figure 24) which has a notch 127 therein to engage a plate 128 when the lever 51 is moved to operative position.

Pivotally connected to the bar 141 at 144 is another lever 145 that is pivoted on a fixed pivot 146. The free end of the lever 145 is adapted to engage a stud or pin 147 carried by the driven member 135. Pivoted at 148 to the lower end of the bar 141 is a lever 149 mounted on a fixed pivot 150. A pin 151 carried by the lever 149 is adapted to engage a catch 152 on the end of a bellcrank lever 153 carried on a fixed pivot 154. The lever 153 has an arm 155 having a cam surface 156 adapted to be engaged by the pin 147 under certain conditions of operation which will be later referred to.

Figure 2:
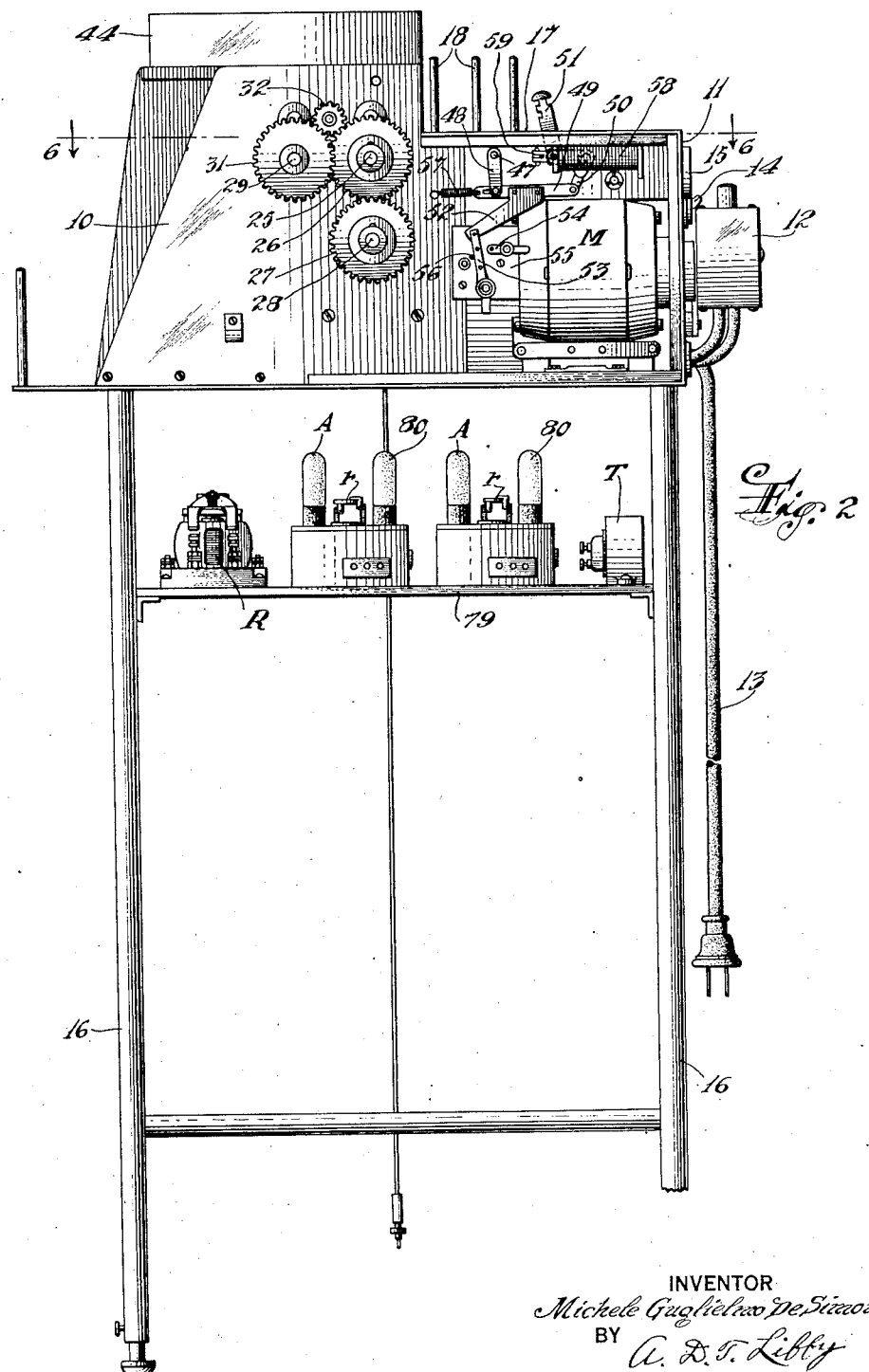
Figure 2 is a view of Figure 1, looking at the left-hand side thereof.

Fastened to the link 49 is an arm of good insulating material 52 connected at its free end with a switch member 53 adapted to engage a fixed contact member 54, the parts 53 and 54 being carried on a suitable insulator 55 (see Figure 2) fastened to the side of the casing 10. In neutral position, the switch lever 53 engages a stop 56, being held against this stop by a spring 57 having one end fastened to a part of the casing and the other end to the link 49 which is slotted at one end as shown in Figures 2 and 27 to provide for the closing of the contact members 53 and 54 before the arm 48 is operated to move the clutch mechanism for the purpose to be hereinafter described.

Mounted on a part of the casing 10, near the starting lever 51, is a magnet 58 having a plunger with an arm 59 which is adapted to engage the starting lever 51 to release it from its operative position for a purpose which will be hereinafter described.

Mounted within the casing 10 is a bracket 60 supporting between its arms a shaft 61. On one end of the shaft 61 is mounted an arm 62 which is pivotally attached (see Figure 9) to a crossbar 63 carrying at its opposite ends slides 64 on which are positioned card-engaging blocks 65 that are adapted to move within the slots 66 in the top plate 17. The blocks 65 are only thick enough to extend through the plate 17 and project less than the thickness of a card, which is .007″, above the surface of the plate 17, whereby only one card will be engaged at a time on movement of the slides 64. These analyzing cards, for the particular apparatus described herein, are punched with round holes in columns of 1 to 9 and not columns of 10 digits using the zero, although other types of analyzing cards such as the Hollerith type may be used if desired; but in either case there is but one hole or perforation in any one vertical column of the digits used.

The shaft 61, at its opposite end, carries a lever 67 having a link 68 pivotally attached to an arm 69 pivoted at 70 to the side of the casing. The shaft 25 carries a cam 71 that is adapted to engage the upper end of the lever 69 at the proper time in the cycle of operation of the structure. However, from the description just given, it will be seen that when the cam 71 engages the lever 69, this will turn the shaft 61 and cause the arm 62 to move the bar 63 and its sides 64 to bring a card forward into mesh with the knurled rollers 24 and their cooperating rollers 23 on the shaft 21, which will pass the card forward into engagement with the rollers 23 on the shaft 22 and the roller 30 on the shaft 29. A spring 63' acts to return the parts to card-starting position after the cam 71 moves out of contact with the lever 69.

Figure 4:
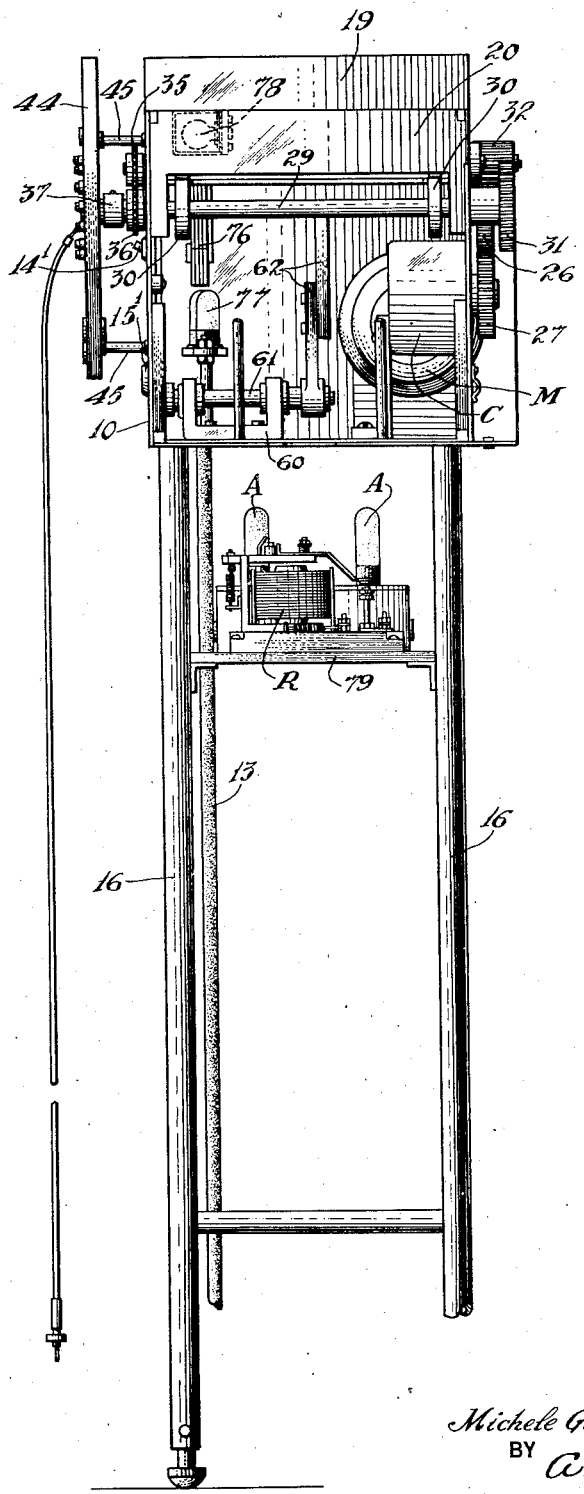
Figure 4 is a view similar to Figure 1 but looking at the opposite end.

The partition 19 carries insulating means 72 (see Figure 24) which in turn supports a plunger 73 which, when no card is passing through the sensing machine, is held by a spring 74 in engagement with a contact 75 carried by the top plate 17. The top plate 17 is slotted between the shaft 21 and 22, and positioned in this slot are the ends of light-transmitting members 76, such as Lucite, which are given any desired shape, one form being shown more particularly in Figure 24. These Lucite members are carried in any suitable support and are shaped as indicated more particularly in Figure 24 to cooperate with individual photo-electric cells 77, each Lucite strip having its own small photo-electric cell, four of these strips being indicated in Figures 4, 5, and 6, although the number of strips may be different to meet the requirements, four being chosen in this case to cooperate with the setting-up apparatus to be later described. A source of light, such as a lamp 78, shown in dotted lines in Figures 4, and 5, is mounted in a socket directly above the ends of the Lucite members 76 which are positioned over the slot in the plate 17. It will be understood that there is a Lucite strip for each column of digits used on the sensing card, and each Lucite strip has its own electronic-tube amplifier A and control relays r and 97, in addition to its own photo-electric cell to which reference has been made.

Below the casing 10 and supported by the legs 16, is a shelf 79 on which is mounted a transformer T and a relay R, together with four units, each comprising an amplifier A, a rectifier 80 and a relay r, one unit for each photo-electric cell circuit. These pieces of apparatus are shown in their circuit arrangement in Figure 24 and their operation will be later described.

*Setting-up mechanism*

The setting-up mechanism comprises two casings 81 and 82, one superimposed on the other and fastened together by studs and wing nuts 129. The bottom casing 81, as shown in the drawings, is adapted to receive or fit over a calculating machine, the buttons B of which, shown in dotted lines in Figures 17 and 18, are adapted to be engaged by the ends of plungers 83 which are set up for actuation in a manner as generally set forth in my Patent 2,195,080 to which reference has previously been made. While my present construction follows generally the arrangement of my patent above referred to, certain details providing faster and more efficient operation have been developed by me and will now be described.

Between two spaced side walls 84 and 85 of the casing 82 there are positioned a plurality of cross support plates 86, nine being shown (see Figures 15 and 16). Since these nine structures are all alike, a description of one will suffice for all. Each support plate 86 carries a channel-shaped member 87 that in turn acts as a guide and support for the plungers 83. A spring 88 surrounds the plungers 83 and is positioned within the channel member 87 and acts to hold the plungers 83 in normal or idle position. Pivoted to the upper end of the plungers 83 are bellcrank levers 89. The lever 89 carries a stop pin 90 to which one end of a spring 91 is attached and holds the pin 90 against stop fingers 114 carried by the operating bar 93. The opposite end of the spring 91 is fastened at 92 to an operating bar 93 which is held by a spring 94 in the position shown in Figure 19, whereby the bell-crank levers 89 normally stand at an angle from the vertical. The opposite end of the operating bar 93 is connected by a bell-crank lever 95 to a plunger 96 of a solenoid magnet 97 positioned in one end of the casing 82 as shown in Figures 14, 15, and 16. The lever 95 is pivoted at 95' to a suitable support member which for the purpose of clarity is not illustrated in Figure 18.

One end of the lever 95 is adapted to engage an insulator 98 carried by a spring 99 to close the contact 100, the object of which will be later described. Also carried by each plate 86 is a slide or trapping bar 101 which has a pair of oblong slots 102 to receive guide-and-support studs 103 which are fastened to the support plate 86. One end of the slide bar 101 carries a pin 104 which is adapted to be engaged by a bell-crank lever 105 connected to a plunger 106 of an electro-magnet 107 of the solenoid type. These solenoids are positioned on one side of the casing 82 as shown in Figures 15 and 16. The slide bar 101 is provided with a notch 108 to receive one end of a pawl 109 that is pivotally supported on the support plate 86, a spring 110 being used to cause the pawl 109 to engage the notch 108 when the slide bar 101 is moved in a manner to be hereinafter described.

Each slide or trapping bar 101 carries a plurality of catches 111, one for each lever 89 in a row defined by the bar 101. Each catch 111 is acted on by a spring 112 so as to cause the end of the catch 111 to pass over the nose 113 of its associated lever 89 to hold it in trapped or vertical position after a positioning bar 93 has been moved by its magnet 97 to bring the levers 89 associated therewith into trapping position in a manner to be later described in the operation of the combined structure.

The casing 82 is carries an electro-magnet K which may be of the double-plunger type as shown in Figure 14. This plunger is connected by a bell-crank lever 115 through a link 116 to a bar 117, to which is attached a plurality of L-shaped bars 118 having fingers 121 (see Figures 15, 22 and 28), a fragmentary portion of one of which is shown in Figure 22, that are used for engaging the upper ends of the levers 89 when they have been moved to trapped position. To the opposite ends of each of the bars 118, there is attached, by means of dowel pins 168 and screw 169, a block 165 which has a stud 119 and a threaded hole 166 for a screw 170 going through the bar 117 into the block 165 (see Figures 28 and 29) Figure 28 being drawn so the screw 170 and stud 119 are in the same position as in Figure 14, thereby carrying the bars 118 at an angle so that, as the bar 117 is moved to the right, looking at Figure 14, the fingers 121, which are on the downward side, will immediately come into engagement with the ends of the levers 89. There are shown four of these bars, similar to Figure 22, and these are provided by studs 119 on an end member of the casing 82 (see Figures 13 and 14) the opposite ends being pivoted on a plate carried by the casing. Another somewhat similar bar 120, is a release bar, the center of which is shown in Figure 23. The bar 120 has a plurality of fingers 121, similar to those on the bar 118, which are adapted to engage the upper ends of the pawls 109 to release the trapping bars 101. The bars 120 are carried on blocks 165 and pivotally connected to the bar 117 by screws 170 and pivoted by studs 119a in the same manner as above described with respect to the bars 118. The central portion 122, while engaging two of the adjacent pawls 109, also engages a lever 123 by way of the notch 160. The lever 123 is pivoted at 167 to an arm 163 fastened in any satisfactory manner as by rivets 164 to the frame support plate 86. The free end 161 of the lever 123 is positioned in an elongated orifice 162 in the rod 124. The notch 160 and the orifice 162 in the rod 124 provided a delayed action in the operation of the rod 124, thereby allowing the bar 120 to perform its operation on the pawls 109 before the rod 124 is actuated. The rod 124 actuates the touch-bar 125 of the calculating machine which is housed within the casing 81 (see Figure 12). The touch bar 125, which is operated by the bar or rod 124, sets into operation the mechanism of the adding machine whereby this part of the mechanism operates to enter the number set up by the cards passing through the sensing mechanism and setting up mechanism as described. A total key 126 which, as indicated is actuated by hand, is used to initiate a total taking operation in the calculating machine carried within the housing 18.

*Operation*

Coming now to the operation of my improved mechanism and referring particularly to Figure 24, the source of supply, which is usually alternating current, is connected to the switches 12, 14, 14' and to the plug sockets 15 and 15'. The plug socket 15 is connected to the transformer T which furnishes low voltage current to the lamp 78 that provides light for the photo-electric cells 77. The switch 14' controls the application of current to the outlet 15' through a rectifier 80 to the amplifier tube A which is also connected to the photo-electric cell 77. Each circuit has its own photo-electric cell, Lucite member 76 and electric amplifier tube A, as well as a relay r, the magnet of only one being shown. The "make" contacts of the relays r are connected by conductors 200 to the relay magnets 97, the "make" contacts of which are commoned and connected by a conductor 201 to the segment P on the distributor 44. The segment P1 of the distributor 44 is connected by a conductor 202 to the common side of the electro-magnets 97, and also to the common side of all the electro-magnets 107. Each electro-magnet 107 is connected by a conductor forming part of a group 203 through the plug-in contacts 1 to 9 to its respective contacts 1 to 9 on the distributor 44. The segment P2 of the distributor is connected by a conductor 204 to one side of the relay R and also by a conductor 205 to the switch contact 53. The segment P3 of the distributor is connected by conductors 206 and 207 to the electro-magnet K and also by a conductor 208 to the main line switch 12. The segment P4 of the distributor is connected by a conductor 209 to one side of the relay R, while the contact P5 of the distributor is connected by a conductor 210 to the pin 73 which is in engagement with the contact 75 that in turn is connected by a conductor 211 to the electro-magnet 58, and this in turn is connected by conductors 212 and 213 to one side of the line and also to the contacts 54.

In starting the apparatus, current is applied first to the rectifier and amplifier tubes and then to the light 78 in the manner just described. On closing the line switch 12, the motor M is started into operation. Then on depressing the starting lever 51, the motor is engaged through the clutch mechanism C as follows; as depression of the lever 51 operates the bell-crank lever 50 and this in turn moves the link 49 which, through the arm 47, will depress the lever arm 143 moving the bar 141 downwardly, thereby causing the lever 138 to release the pawl 136 which, by reason of the spring 137, will move into engagement with the ratchet teeth on the driving member 134. At the same time, just prior to the engagement of the pawl 136 with the member 134, the lever 145 is released from engagement with the pin 147; also, the lever 149 will move so that the pin 151 will engage the catch 152. Movement of these parts will allow the driving member 134 to pick up the driven member 135 through the pawl 136 and turn the shaft 28 which carries the gear 27 that is in mesh with the other gears, thereby driving the shaft 29 and the distributor arm 37. While the pin 147 may engage the cam 156 on each rotation and lift the lever 153, the bar 141 cannot return to inoperative position until the starting lever 51—which is held in operative position by the medium of the notch 127 engaging the plate 128—has been released in the manner to be later referred to. The operation of the lever 51 also moves the switch lever 53 into engagement with the contact 54 carrying current to the distributor ring P2.

Immediately the motor starts into operation, the mechanism for feeding the cards forward (see Figures 7, 8 and 9) and associated parts are operated and a card, with the "9" perforation positions leading, is moved forward between the rollers 23 and 24, and at the same time the card D with the perforations punched therein or equivalent means passes below the partition 19 and between the contact pin 73 and the stationary contact 75, thereby opening the circuit of the release magnet 58, and before the distributor arm 37—which rotates in a counter-clockwise direction, looking at Figure 24—reaches the contact P5 which feeds current by the conductor 210 to the contacts 73 and 75 and the electro-magnet 58 by the conductor 211.

As the distributor arm 37 continues to rotate, the card D moves forward to reach the rollers 23 and 30, and the perforations in the card move over the ends of the light-transmitting members 76 which pass light from the lamp 78 through the proper photo-electric cell 77 which triggers the amplifier tube A, closing the circuit through one of the relays r associated with the amplifier tube that is energized. This, in turn, will operate its corresponding electro-magnet 97, by way of one of the conductors 200 and the conductors 202, to the ring p1, and from the contact c in plate 42 and the contact d to the ring p2, and by way of the conductors 204 and 205 and switch contacts 53 and 54 and the conductors 213, to the other side of the supply circuit thereby moving the positioning bar 93 so that all of the levers 89 associated with their positioning bar are moved to trapping position. When the electro-magnet 97 is operated, the distributor arm 37 is in engagement with one of the contacts 1 to 9, corresponding to the location of the opening in the card, and a circuit is completed across this contact to the segment P by reason of the plate 41 (see Figure 25), completing a circuit through the corresponding electro-magnet 107 from one side of the line switch 12 through the contact of one of the relays r and one of the conductors 200 and the contact 100 of the particular electromagnet 97, conductor 201, the segment P, and by way of the plate 41 and contacts a and b to one of the contacts 1 to 9 and to one of the associate electromagnets 107, and by the common conductor 202, the segment p1, across the plate 42 by way of contacts c and d, to the ring p2, and the conductors 204 and 205, switch contacts 53 and 54 back to the opposite side of the line switch 12. The circuit thus completed, will operate the trapping bar 101 to trap the corresponding lever 89 through the medium of the catch 111 which passes over the end 113 of the lever 89 as indicated in Figure 21. It is to be understood that each relay 97 and its cooperating electro-magnet 107 is operated before its associated relay r opens its contact.

By way of further explanation, when, for example, a lever 89 is trapped for some number, for example one or more 9's, this means that the associated slide bar 101 is locked by the pawl 109 in the trapped position so that when a number of a lower order, for example 2, is sensed, and the corresponding magnet 97 operates its bar 93, all the levers 89 operated by the bar 93, including those in the "9" position, must be operated. By reference to Figure 20, it will be seen that the end of the pawl 111 will pass under the end 113 of the lever 89 when the "9" has been trapped, so that the actuation of the bar 93 for the numeral or order 2 will operate all the levers 89 connected therewith, and the end 113 of the lever 89 in the "9" position will engage the top of the pawl 111 and merely move it downward around its pivot against the tension of the spring 112. Then, as soon as the bar 93 is released, the lever 89 over the "9" order will go back to normal position, which will be evident from Figure 20. After all of the levers 89 have been trapped in accordance with the perforations or designs on the card, and before the card passes from the contacts 73 and 75, the distributor arm 37 has moved so that the segments P3 and P4 are connected by contacts a and b through the plate 41 (see Figure 25) and a circuit is completed by way of conductors 208, 206, segment p3, plate 41, contacts a and b, plate p4 conductor 209, relay magnet R conductor 205 switch contacts 53 and 54 and conductor 213, to the opposite side of the line. This energizes the relay R whose armature carries conductor arms 216 which bridge the contacts 214 and 215, completing a circuit by way of conductors 217 and 218 to the magnet K, the return circuit of which is completed by way of the conductors 207 and 208. Since the electro-magnet K takes considerable current, I prefer to introduce the special relay R as described as the switch members 216 and cooperating contacts 214 and 215 are adapted to carry the larger current required by the electro-magnet K. The actuation of the electromagnet K turns the operating bars 118 and 120 so the fingers 121 thereon will engage the L-shaped ends of the levers 89 that have been trapped, as well as the touch-bar rod 124, and at the same time releases the pawls 109, thereby releasing the trapping bars 101 and restoring all of the setting-up mechanism to neutral position, ready for the next succeeding card in the stack which falls down onto the plate 17 ready to be moved forward through the sensing mechanism when an additional cycle takes place as has been described, until all the cards have been stacked on the plate 17 have been passed through the sensing machine. It may be mentioned in passing that the action of the magnet K is so rapid and positive that even if the levers 89 and pawls 109 were all engaged simultaneously by the bars 118 and 120, this would not interfere with the correct operation of the machine; but as a matter of fact, the operating bars 118 and 120 engage the ends of the trapped levers 89 just prior to the release of the catches 109 by the parts on the bar 120, and also before the part 122 on the bar 120 engages the bottom of the slot 160 in the lever 123.

When the last card passes through the sensing mechanism and the distributor arm 37 moves to the position whereby the segment $P_3$ is bridged by the contacts $a$ and $b$ and plate 41 to contact $P_5$, a circuit is completed through the contacts 73 and 75 and the electromagnet 58 by way of conductors 213, 212, 211, 210 contact $P_5$, contacts $b$ and $a$, plate 41, segment $P_3$, conductors 206, 208, which will move the lever 51 so that the notch 127 will be moved out of engagement with the plate 128, allowing the lever 51 to move back to normal position and with it the associated parts, opening the circuit between the contacts 53 and 54, cutting off the current from the mechanism and moving the lever 143 to raise the bar 141 immediately after the pin 147 engages the cam 156 to raise the lever 153 to release the pin 151 of the lever 149, this return action of the bar 141 being accelerated by a spring 157. The upward movement of the bar 141 causes the lever 138 to engage the pawl 136, releasing it from engagement, when the driving member 134 and the pin 147 will, in due course, engage the lever 145 which has also been returned to the position shown in Figure 27 by the upward movement of the bar 141. Thus the motor is disengaged from the distributor shaft 29 when the distributor arm 37 has reached the neutral position shown in Figure 24.

It is to be understood that the gears, rollers and other parts moving the cards, are so designed and interconnected with the distributor as to produce the necessary sequence of operations as has been described. Furthermore, it is to be understood that the recording mechanism shown in Figures 8, 9 and 10 of my patent previously referred to may be utilized in the manner set forth in said patent.

It is obvious that many of the precise details may be varied over a wide range without departing from the spirit of my invention and the scope of the appended claims:

I claim:

1. A record-controlled electro-mechanical mechanism for actuating a calculating machine having keys arranged in denominational columns and digital rows, means for feeding record cards having indicia differentially located in similarly arranged columns and rows, and indicia sensing device for each column, said record cards being fed past said sensing devices by said feeding means, an electrical circuit for each sensing device and closed thereby as an indicium is sensed, an electro-magnet in each circuit, a positioning bar for each column of keys and shifted in response to energization of a related electromagnet, a plurality of key-operating members arranged in operative relation with the calculating machine keys, movable setting members carried by said operating members, each of the setting members in a denominational column being operated when the related positioning bar is shifted, a plurality of trapping devices, one for each digital row of keys and adapted to trap operated setting members in operated position, operating magnets for each of said trapping devices, a distributor operated in timed relation to the record-feeding means, and circuits including said distributor, said operating magnets and a portion of said first-mentioned circuits, whereby the trapping devices operate to trap in each denominational column only that one of the setting members having a digital value corresponding to the indicium sensed in the related record column.

2. A record-controlled electro-mechanical mechanism for actuating a calculating machine having keys arranged in denominational columns and digital rows, means for feeding record cards having indicia differentially located in similarly arranged columns and rows, an indicia sensing device for each column, said record cards being fed past said sensing devices by said feeding means, an electrical circuit for each sensing device and closed thereby as an indicium is sensed, an electro-magnet in each circuit, a positioning bar for each column of keys and shifted in response to energization of a related electromagnet, a plurality of key-operating members arranged in operative relation with the calculating machine keys, movable setting members carried by said operating members, each of the setting members in a denominational column being operated when the related positioning bar is shifted, a plurality of trapping devices, one for each digital row of keys and adapted to trap operated setting members in operated position, operating magnets for each of said trapping devices, a distributor operated in timed relation to the record-feeding means, and circuits including said distributor, said operating magnets and a portion of said first-mentioned circuits, whereby the trapping devices operate to trap in each denominational column only that one of the setting members having a digital value corresponding to the indicium sensed in the related record column, and means also controlled by the distributor for simultaneously actuating each of the trapped setting devices and the associated key-operating members, whereby the calculating machine keys are set in accordance with the sensed record indicia.

3. Apparatus for the purpose described including sensing and setting-up sections of a mechanism for actuating a calculating machine having keys arranged in denominational columns and digital rows, means for feeding record cards having indicia differentially located in similarly arranged columns and rows, indicia-sensing means for each column comprising; a source of light, a photoelectric cell positioned to receive said light, an electronic tube and relay for translating said light into an electrical impulse according to the indicia on the cards; electro-magnetic means carried by the setting-up section for receiving said electrical impulses, other electromagnetic means carried by the setting-up section, parts on the setting-up section adapted to be moved into trapping position by said first mentioned electromagnetic means which also act to set up, in part, circuits through said other electromagnetic means, trapping means operated by said other electro-magnetic means for trapping certain of said parts according to the indicia on the cards going through the sensing section, a distributor on the sensing section for controlling the time of operation on said last-mentioned electro-magnetic means, means at the sensing section for operating the distributor in timed relation to the record card feeding means, means at the setting-up section for moving said trapped parts into engagement with part of a calculating machine and also immediately thereafter for releasing the trapping means, and further means, including a pair of card-controlled contacts, at the sensing station for releasing the distributor from the operating means at a predetermined time after the last card has been passed through the sending mechanism.

4. Apparatus for the purpose described including; mechanism for sending electrical impulses as defined by indicia differentially arranged in denominational columns and digital rows on cards passed through the said mechanism, a setting-up mechanism comprising groups of electro-mechanical devices corresponding to said columns, each group having an electro-magnet for receiving said electrical impulses and energized for a small fraction of a cycle of operation, each electro-magnet having circuit contacts, a positioning bar for each of said electro-magnets, parts operatively connected to each positioning bar and adapted to be trapped in position for actuating members on a calculating mechanism, other electromechanical means also included in said setting-up mechanism and including electro-magnets, one for each digital row, with an interconnected sliding bar carrying means for trapping said operatively connected parts adapted to be trapped so they may move said members on the calculating mechanism, said last mentioned electro-magnets being energized by current supplied by way of said contacts on said electro-magnets which receive said electrical impulses and still further electro-mechanical means for moving, on the completion of the passage of a card through the sending mechanism, all of said trapped parts to actuate the members on the calculating mechanism and then releasing said trapping means, and a distributor mechanically connected to the sending mechanism and synchronized therewith for controlling the time of action of all of said electro-mechanical means.

5. Apparatus for the purpose described including, mechanism for sending groups of electrical impulses in predetermined intervals by differentially arranged indicia-bearing cards which are passed through said apparatus, mechanism for translating said impulses into mechanical movements to actuate members on a calculating mechanism, means for starting all of said mechanisms into operation, said translating mechanism including presetting device and also parts for engaging said members on the calculating mechanism, said parts being operated by said presetting devices, which include levers pivoted directly on the parts that engage said members on the calculating mechanism and slidable bars operatively associated with the levers, said translating mechanism further including slidable bars carrying trapping means for trapping said levers, electro-magnets adapted to be selectively energized by certain of said electrical impulses for operating the sliding bars operatively associated with said levers, other electro-magnets adapted to be selectively energized by other electrical impulses to operate the sliding bars carrying said trapping means, and further electro-magnetic means for operating all of said translating mechanism's simultaneously after said devices have been preset, a distributor with means for operating it forming part of the sending mechanism and synchronized therewith for controlling the time of action of all of said electro-magnets, the said electrical impulse sending mechanism having means, normally held in inoperative position by the cards as they pass through the sending mechanism, but movable into operative position when the last card is passed through the first mentioned mechanism and cooperating means on the distributor for assisting in releasing said starting means to stop the operation of the sending and translating mechanism and associated parts.

6. A record-controlled electro-mechanical mechanism as set forth in claim 2 further characterized in that the mechanism includes sensing and setting up sections set into co-operative action by an electro-magnetically controlled switching means, the sensing section carrying the distributor with different circuit contacts thereon, the sensing section also having a pair of contacts utilized in co-operation with a pair of said contacts on the distributor for stopping the mechanism, said first mentioned pair of co-operative contacts being held apart by said cards as they are passed through the sensing section of the mechanism by said feeding means, and only brought into cooperative circuit engagement with the said cooperative pair of contacts on the distributor on passage of the last card through the feeding means, the closure of said co-operative pairs of contacts acting to close a circuit through the electro-magnet of said controlled switching means and cause the electro-magnet to operate the switching means to stop all of said mechanisms.

7. Apparatus for the purpose described including mechanism for passing cards therethrough, said cards carrying certain preformed indicia differentially arranged in digital rows and denominational columns thereon for future tabulation purposes; electrical means brought into operation by said preformed differentially arranged indicia on the cards as they are passed through said mechanism for establishing electrical circuits in a predetermined manner as determined by said differentially arranged indicia, setting-up mechanism comprising electro-mechanical groups of devices, each group having an electro-magnet included in each of said established electrical circuits, a bar operatively connected to each of said electro-magnets, controlled by indicia in the digital rows, movable members adapted to engage calculating machine parts, setting devices carried by said movable members and being arranged in rows, those in each row being operatively connected to their associated bar whereby movement of the bar by its electro-magnet will move the setting devices associated with the bar into trapping position, means including electro-magnets controlled by indicia in the denominational columns and interconnected mechanical means having trapping parts actuated thereby for trapping said setting devices, a distributor having a rotatable arm operatively timed with the movement of said cards through said passing mechanism and carrying a plurality of contacts certain of which are for completing circuits through said trapping electro-magnetic means for actuating the interconnected mechanical means which trap said setting devices, means controlled through the distributor for simultaneously actuating all of said trapped setting devices for the purpose described, a motor, clutch means for connecting the motor to said card-passing mechanism and the distributor, starting mechanism including a starting lever for moving said clutch into engaging position with means for holding said lever in starting position, switch means operated by said starting lever for applying current to certain of said contacts on the distributor for the purpose described, a stop circuit including an electro-magnet for moving said starting lever from its holding position, with means controlled in part by the cards for assisting in completing the stop circuit after the last card goes through the passing mechanism, said circuit also including certain of said contacts on the distributor which finally complete the stop circuit, whereby the electro-magnet therein is energized and moves the starting lever from its holding position and means for moving the starting lever and switch lever back to normal clutch-releasing and circuit-opening position respectively when the stop circuit is closed.

8. Apparatus as set forth in claim 7, further characterized in that the starting lever is connected to the switch lever and clutch through a linkage such that there is a time delay between the operation of the switch lever and the clutch whereby the switch lever is moved first to establish a circuit to certain of said distributor contacts before the clutch is actuated.

MICHELE GUGLIELMO DE SIMONE.

REFERENCES CITED

The following references are of record in the file of this patent:

UNITED STATES PATENTS

| Number | Name | Date |
|---|---|---|
| 1,976,617 | Lake et al. | Oct. 9, 1934 |